United States Patent [19]
Midland

[11] Patent Number: 4,651,197
[45] Date of Patent: Mar. 17, 1987

[54] BEAM INDEX SYSTEM HAVING TWO DISTINCT LEVELS OF INDEX VIDEO SIGNAL

[75] Inventor: Richard W. Midland, Inverness, Ill.

[73] Assignee: Zenith Electronics Corporation, Glenview, Ill.

[21] Appl. No.: 738,797

[22] Filed: May 28, 1985

[51] Int. Cl.$^4$ ............................................. H04N 9/24
[52] U.S. Cl. ........................................ 358/69; 358/67
[58] Field of Search ............................. 358/67, 69, 70

[56] References Cited

U.S. PATENT DOCUMENTS

| | | |
|---|---|---|
| 3,406,251 | 10/1968 | Jones ..................................... 358/67 |
| 3,977,022 | 8/1976 | Sunstein ................................ 358/67 |
| 4,408,223 | 10/1983 | Midland ................................ 358/67 |
| 4,468,690 | 8/1984 | Midland ................................ 358/67 |
| 4,527,192 | 7/1985 | Midland et al. ....................... 358/67 |

*Primary Examiner*—James J. Groody
*Assistant Examiner*—E. Anne Toth

[57] ABSTRACT

A wide-band single beam index signal system includes a photo multiplier tube supplying a decay compensation circuit for developing an output signal responsive to excitation of index strips by the electron beam of the CRT. The output signal is supplied to a differentiator to determine its zero crossing and supplied to a comparator circuit where an index signal pulse is developed. The timing of the index signal is determined by the zero crossing. Video information is clocked from a computer, on a pixel-by-pixel basis, under control of the index signal. The index signal also controls production of a first index video signal and a second index video signal, depending upon the presence or absence of video information. Means are included for turning off the electron beam between index strips. The output of the differentiator is offset for noise compensation. An offset adjustment transistor is included for changing the offset to compensate for the greater excitation of the index strip in the presence of video and to thereby maintain the zero crossing reference.

5 Claims, 2 Drawing Figures

BEAM INDEX SYSTEM HAVING TWO DISTINCT LEVELS OF INDEX VIDEO SIGNAL

CROSS REFERENCE TO RELATED PATENTS AND PATENT APPLICATION

This invention is related to and uses apparatus disclosed in U.S. Pat. Nos. 4,408,223 and 4,468,690 to Richard W. Midland and apparatus disclosed and claimed in copending application Ser. No. 470,884, filed Feb. 28, 1983, now U.S. Pat. No. 4,527,192, entitled Index Signal Enhancement Circuit in the names of Richard W. Midland and Boris Rozansky, all of which are assigned to Zenith Electronics Corporation.

BACKGROUND OF THE INVENTION AND PRIOR ART

The high resolution capability of the single beam index cathode ray tube (CRT) is well known. The proliferation of computer terminals and the desire to utilize color CRTs for information display has understandably created an interest in beam index CRTs as color monitors. As discussed in the above-mentioned copending application and patents, index signals of the wide-band type, which literally control the beam on a stripe-by-stripe basis rather than on a line-by-line basis, afford an added dimension in display precision. In a pixel display wherein a group of pixels of information is stored in a computer memory corresponding to a pixel array that is reproducible on the face of a CRT, the index signal is used to trigger the release of red, green and blue (RGB) video data for controlling the current in the CRT beam on a pixel-by-pixel basis. RGB video data applied to the tube is controlled by the index signal, with the result being that the color data is supplied when the beam is over the corresponding color stripe. A "black surround" of inert material between adjacent color phosphor stripes provides a guard band or safety zone to help prevent the electron beam from "spilling over" onto an adjacent color stripe.

In accordance with the above-mentioned related patents and application, the periodicity of the index strips in the CRT is known and once an index strip has been identified, the scanning electron beam is turned off until the next index strip is anticipated, whereupon the beam is again turned on. In a narrow-band system, on the contrary, the index signal is developed for each line from a plurality of "run in strips" situated off screen. Because of these factors, the index beam current, called the index video, may be made quite small in a narrow-band system.

The index signal in a wide-band system is prone to noise in the form of stray photons emitted by the index strips, which generally comprise monochrome phosphors. The stray photons are due to bombardment by "spillover" electrons, that is electrons intended for adjacent color stripes. Consequently, to assure that the wide-band system can find or recognize an index strip, a much larger index video beam current is required than that used in narrow-band systems, which have much better signal to noise ratios. Turning off the electron beam between index strips in the wide-band system enhances the blackness of the picture tube screen, thus improving the contrast of the display.

The present invention further enhances the blackness of the screen during periods of no video data, which in a color monitor supplied with pixel type data, can be quite significant. As is well known, the blackness of the screen is determined by the ambient light level. In a no video condition, any energization of the color stripes is very noticeable. Even the relatively low level index video beam may spill over onto an adjacent color stripe and create undesirable light at the CRT viewing screen. The invention recognizes that under a no video condition, the index strip will be easier "to find" because of the absence of stray photons caused by video beam spill-over. Therefore, when the beam is positioned to strike an index strip and there is no video information, a lower level of index video drive is used. This lower level index video drive results in less spillover of the index video electron beam onto adjacent color phosphor stripes, with consequent minimization of random illumination. Thus the quality of the display is enhanced under a no video condition while the precision in identifying the index strips is maintained under video conditions. This is accomplished without the sacrifice of brightness that would accompany an increase in the guard band.

OBJECTS OF THE INVENTION

A principal object of the invention is to provide a novel wide-band single beam index CRT system.

Another object of the invention is to provide a wide-band single beam index CRT system with enhanced blackness characteristics.

A further object of the invention is to provide a wide-band beam index CRT system of enhanced optical characteristics that is reliable in operation.

BRIEF DESCRIPTION OF THE DRAWINGS

Further objects and advantages of the invention will be apparent upon reading the following description in conjunction with the drawings, in which.

DESCRIPTION OF THE PREFERRED EMBODIMENT

Figure 1:
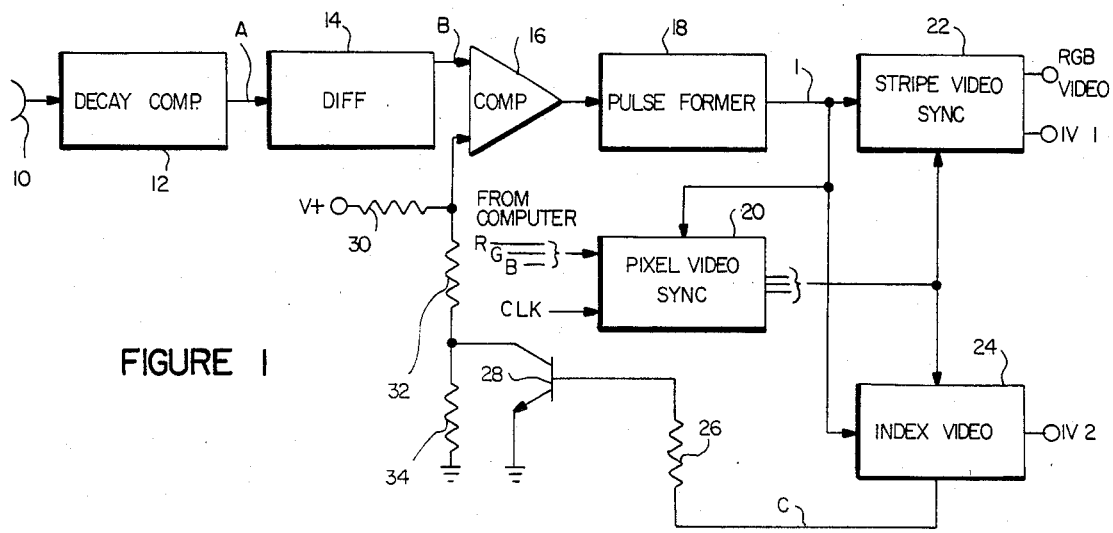
FIG. 1 represents a partial block, partial schematic diagram of the system of the invention.

Referring to FIG. 1, a photo multiplier tube (PMT) 10 is coupled to a decay compensation circuit 12 which, in turn, supplies a differentiation circuit 14 having an output coupled to one input of a comparator circuit 16. The output of the comparator circuit is supplied to a pulse former circuit 18 which supplies an index signal I to a pixel video sync circuit 20, a stripe video sync circuit 22 and an index video circuit 24. The pixel video sync circuit 20 has RGB color inputs and a clock signal input, all from a computer (not shown). The RGB output is supplied to stripe video sync circuit 22 and index video circuit 24. The output of circuit 22 consists of RGB video data and index video pulses IV1. An IV1 pulse is generated whenever the electron beam is in position to strike an index strip on the CRT screen. The output of circuit 24 consists of index video pulses IV2 which occur when the electron beam is in position to strike an index strip on the CRT screen during the occurrence of video information. The IV2 pulses are also supplied through a resistor 26 to the base electrode of a threshold adjusting transistor 28, the emitter electrode of which is connected to ground. The collector electrode of transistor 28 is coupled to the lower junction of a voltage divider consisting of a series arrangement of resistors 30, 32 and 34 connected between a source of voltage +V and ground. The upper junction of the voltage divider is connected to the other input of comparator circuit 16.

The circuitry for turning off the CRT electron beam between index strips is omitted for the sake of clarity, since the arrangement and functioning of such circuitry is fully described in the above-related patents and copending application. It will be understood that such circuitry is to be used along with the present invention and, to the extent necessary, the disclosures of the above-patents and copending application are hereby incorporated by reference. It will be appreciated that the circuit of the invention may also be implemented by setting the cutoff level of the electron beam in the CRT such that, in the absence of an index signal, the screen is dark. In that implementation, as those skilled in the art will perceive, an external means is required to locate an initial index strip as the electron beam begins to scan each line.

The present circuit differs from the above-referenced related patents and application in the provision of index video circuit 24 and threshold transistor 28. The RGB video data, the IV1 pulse output and the IV 2 pulse output are all supplied via a suitable video amplifier to the G-1 electrode of a beam index tube (both not shown). The index signal I, in the absence of RGB data, produces an IV1 index video pulse output which drives the CRT at a low level. Likewise, occurrence of the index signal I in the presence of RGB data generates, in addition, an IV2 video pulse output which adds to IV1 to increase the drive to G-1 of the CRT.

The index signal gates or "clocks out" the RGB pixel data from pixel video sync circuit 20. Thus, the presence (or absence) of RGB data is readily ascertained. The index signal also controls stripe video sync circuit 22 and index/video circuit 24 for producing the appropriate RGB video data the IV1 signals, the index video signal and the IV2 index video signal.

Figure 2:
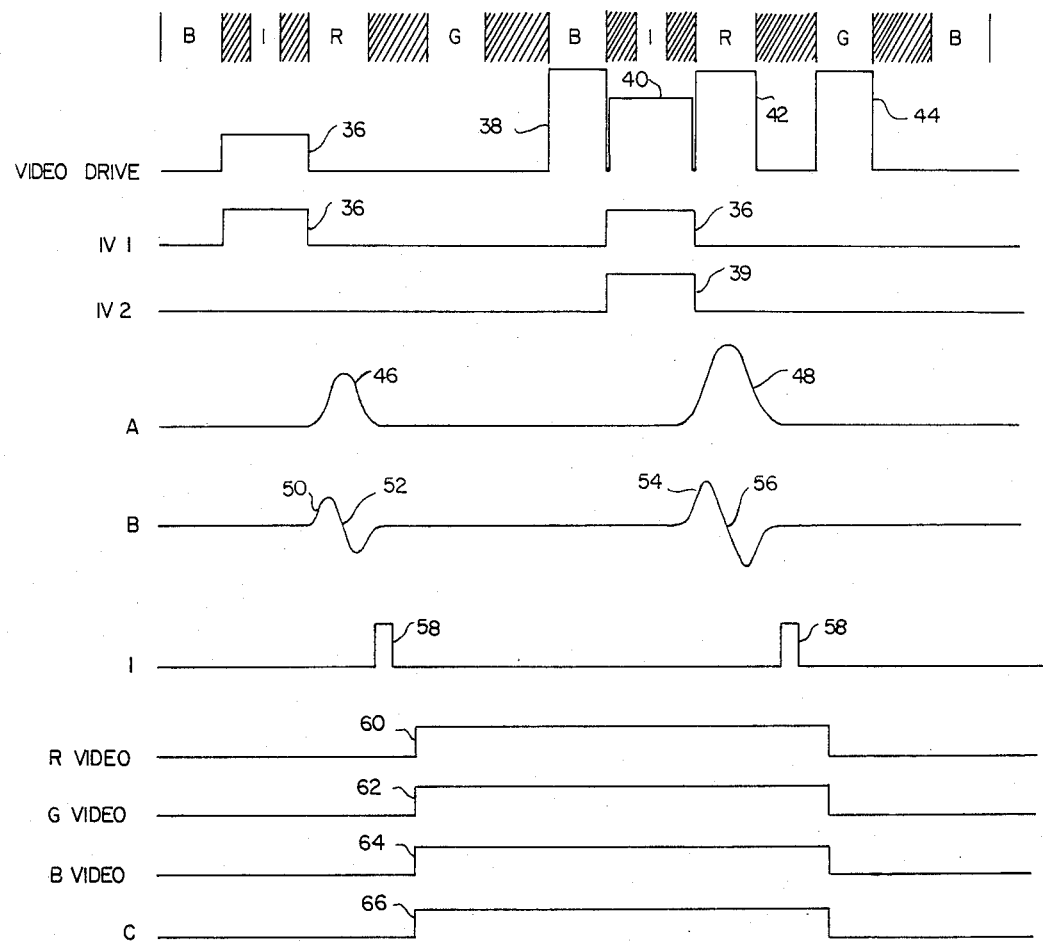
FIG. 2 represents a portion of an index CRT screen and a series of waveforms related thereto.

Reference to FIG. 2 will help explain operation of the dual level index video circuit and the operation of threshold transistor 28. Across the top of FIG. 2 is a schematic representation of a portion of the CRT phosphor screen with R, G, B and I representing red, green and blue color phosphors and the index strips, respectively. The shaded areas indicate the black inert guard band material. Commencing from the left, there is in succession: a stripe of blue colored light-emitting phosphor material; a wider stripe of inert guard band material over which is deposited a strip of index material I; a stripe of red light-emitting phosphor material; a rather wide stripe of inert guard band material; and another wide stripe of green light-emitting phosphor material. This pattern is repeated horizontally across the screen and extends vertically down the screen. A simplified composite video drive signal is illustrated directly beneath the screen portion and beginning at the left includes; a low level signal 36 corresponding to the IV1 index video pulse; a zero level signal during the time the electron beam is positioned over the subsequent red and green phosphor stripes and intervening guard band stripes; a larger level signal 38 corresponding to a blue video signal; an intermediate level signal 40 corresponding to the addition of the IV1 index video signal pulse and the IV2 index video signal pulse; a red video signal 42; and a green video signal 44. The video drive is thus at a zero level in the absence of video when the electron beam is in position to strike other than an index strip and its corresponding guard band; is at a low level in the absence of video when the beam is in position to strike an index strip; and is at a high level in the presence of video when the electron beam is in position to strike an index strip. Consequently, during the no video condition, the small index video drive minimizes any spillover excitation of the adjoining colored light-emitting phosphors, thus enhancing screen blackness. On the other hand, when video data is present and electrons may be undesirably spilling over and striking on index strip I, the index video drive in increased to preserve the signal to noise ratio and enable precise location of the center of the index strip by the PMT and associated circuitry.

Beneath the video drive waveform are the IV1 index video waveform, which consists of a pulse 36 occurring whenever the beam is positioned to strike an index strip, and the IV2 index video waveform which consists of a pulse 39 occurring only when the electron beam is positioned to strike an index strip in the presence of video information. The two pulses, 36 and 39, are added to form pulse 40 in the video drive waveform. It will be appreciated that all of the illustrated pulses represent TTL levels and are not necessarily representative of the amplitude of drive signals produced thereby. For example, in a typical beam index CRT system incorporating the invention, pulse 36 represents a 6 microampere drive current and pulse 40 represents a 25 microampere drive current. Thus, the effect of IV2 is greater than that of IV1 even though the pulses have the same TTL magnitude.

The waveform identified as A is that which appears at the output of decay compensation circuit 12 and illustrates an idealized distribution of photons emitted by the index strip and received by PMT 10. Portion 48 has a larger amplitude than portion 46 because of the greater excitation (due to IV1 and IV2) of the index strip by the electron beam in the presence of video signals. Portions 46 and 48 are shown displaced to the right of their associated index strips since there is a delay in the system which literally results in the index signal I being one or more stripes behind.

Beneath waveform A is a waveform B illustrative of the output of differentiator 14 in FIG. 1 when supplied with waveform A. Waveform B includes rising portions 50 and 54 corresponding to the leading edges of portions 46 and 48 of waveform A, respectively, and zero crossing points 52 and 56. The significance of the zero crossing points will be described below in connection with the threshold transistor 28. The index signal I waveform is also shown and comprises index signal pulses 58 developed in response to waveform B. While index signal pulses 58 are of uniform height, their timing is determined by the zero crossing points of the differentiated waveform B. The R G and B data video waveforms are illustrated by pulses 60, 62 and 64. These waveforms are simultaneously clocked out of pixel video sync circuit 20 by the index signal I. Finally, waveform C, which tracks the RGB video signals, is supplied to threshold transistor 28.

As mentioned, it is important to find the zero crossing of the decay-compensated, differentiated output of the PMT since the index signal I is developed in response thereto. The comparator circuit 16 normally has a DC offset voltage applied to one of its two inputs to compensate for the effects of noise on the zero crossing level detected in the differentiation process. The offset value is empirically determined and is set at approximately 5 percent of the peak signal output from the differentiator. It will be appreciated that if the peak signal output from the differentiator increases while the signal starting and ending levels remain the same, the slope of the signal between its positive and negative peaks will change and result in an inaccurate zero crossing because of the offset. Consequently, to avoid an error in generation of the index signal I in the presence of video, an offset compensation circuit is employed to adjust the DC offset and accommodate the larger signal. Thus waveform C is applied to the base of threshold transistor 28 to drive transistor 28 conductive during occurrence of video, which changes the distribution of current in the voltage divider network. Specifically, the voltage at the junction of resistors 32 and 34 increases when transistor 28 conducts which increases the DC offset voltage applied to the second input of comparator circuit 16 to compensate for zero crossing level change due to the increased signal output from differentiator 14.

What has been described is a novel wide-band beam index circuit that provides different levels of beam excitation current for the index strips, depending upon video conditions. It is recognized that numerous modifications and changes in the described embodiment of the invention will be apparent to those skilled in the art without departing from its true spirit and scope. The invention is to be limited only as defined in the claims.

What is claimed is:

1. In a beam index CRT system of the type including: a single beam CRT having a viewing screen formed of a pattern of groups of different colored light-emitting phosphor stripes with individual stripes being separated by guard bands of inert material, index strips disposed on the obverse side of certain of said guard bands, means for developing an index signal for controlling the application of video data to said CRT as the electron beam in said CRT is positioned to strike different phosphor stripes, means for operating said electron beam at a first level when positioned to strike an index strip, and for turning said electron beam off between index strips in the absence of video data, the improvement comprising:

means for operating said electron beam at a second level, lower than said first level, when said electron beam is in position to strike an index strip, in the absence of video data, to optimize the blackness of the CRT viewing screen in the absence of video data and for increasing the signal to noise ratio of the index signal in the presence of video.

2. The system of claim 1 wherein said index strips are light-emitting and further including a PMT for detecting light emitted from said index strips;

differentiator circuit means coupled to said PMT for determining the center of said index strips for generation of said index signal;

comparator circuit means supplied with an offset voltage for compensating for the effects of noise at said first level; and means for adjusting said offset for compensating for the effects of noise at said second level.

3. The system of claim 2 wherein said second level corresponds to a video drive current of about 6 microamperes and said first level corresponds to a video drive current of about 25 microamperes.

4. A wide-band beam index system including a CRT having a single electron beam comprising:

first means generating a first index video signal for driving said electron beam at a first level when positioned to strike an index strip, in the absence of video information;

second means for generating a second index video signal for driving sid electron beam at a second level when positioned to strike an index strip during occurrence of video information; and means for turning off said electron beam between index strips in the absence of video information.

5. The system of claim 4 further including offset means for compensating for noise at said first beam level when said first means is generating said first index video signal; and means for adjusting said offset means to compensate for noise at said second level when said second means is operating.

* * * * *